United States Patent
Chu et al.

(10) Patent No.: US 10,339,702 B2
(45) Date of Patent: Jul. 2, 2019

(54) METHOD FOR IMPROVING OCCLUDED EDGE QUALITY IN AUGMENTED REALITY BASED ON DEPTH CAMERA

(71) Applicant: NATIONAL TSING HUA UNIVERSITY, Hsinchu (TW)

(72) Inventors: Chih-Hsing Chu, Hsinchu (TW); Wei-Hsuan Chen, Yuanlin (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 113 days.

(21) Appl. No.: 15/649,147

(22) Filed: Jul. 13, 2017

(65) Prior Publication Data

US 2018/0108173 A1     Apr. 19, 2018

(30) Foreign Application Priority Data

Oct. 19, 2016   (TW) .............................. 105133677 A (51) Int. Cl.
```
G06T 15/40      (2011.01)
G06T 19/00      (2011.01)
G06T 19/20      (2011.01)
H04N 13/282     (2018.01)
```
(52) U.S. Cl.
CPC .......... *G06T 15/405* (2013.01); *G06T 19/006* (2013.01); *G06T 19/20* (2013.01); *G06T 2219/2004* (2013.01); *G06T 2219/2012* (2013.01); *H04N 13/282* (2018.05)

(58) Field of Classification Search
CPC .................. G06T 19/006; G06T 19/20; G06T 2219/2004; G06T 15/405; H04N 13/282
See application file for complete search history.

(56) References Cited

U.S. PATENT DOCUMENTS

| | | | |
|---|---|---|---|
| 9,083,960 B2 | 7/2015 | Wagner et al. | |
| 9,378,431 B2 | 6/2016 | Stoeffler et al. | |
| 9,443,350 B2 | 9/2016 | Wagner et al. | |
| 2010/0271466 A1* | 10/2010 | Newton | G06T 15/503 |
| | | | 348/51 |
| 2014/0139639 A1 | 5/2014 | Wagner et al. | |
| 2015/0049955 A1 | 2/2015 | Stoeffler et al. | |
| 2015/0294499 A1 | 10/2015 | Wagner et al. | |
| 2016/0191905 A1* | 6/2016 | Robinson | G06T 5/50 |
| | | | 348/46 |

FOREIGN PATENT DOCUMENTS

| | | |
|---|---|---|
| CN | 104221031 A | 12/2014 |
| TW | 201631963 A | 9/2016 |

* cited by examiner

*Primary Examiner* — Grace Q Li
(74) *Attorney, Agent, or Firm* — Muncy, Geissler, Olds & Lowe, P.C.

(57) ABSTRACT

A method of improving occluded edge quality in an augmented reality system includes a data input step of using a camera set to capture a scene and an object set in the scene to obtain an original image; an occluded region extracting step of obtaining an extracted image by performing a difference operation according to a first image and a second image, which are obtained according to depth buffer calculations according to first and second virtual planes set in the scene; and an occluded image generating step of inserting a virtual object into the original image according to the extracted image, the original image and a third virtual plane, which is set between the first and second virtual planes, to obtain an occluded image with a smoothened occluded edge.

13 Claims, 10 Drawing Sheets

METHOD FOR IMPROVING OCCLUDED EDGE QUALITY IN AUGMENTED REALITY BASED ON DEPTH CAMERA

This application claims priority of No. 105133677 filed in Taiwan R.O.C. on Oct. 19, 2016 under 35 USC 119, the entire content of which is hereby incorporated by reference.

BACKGROUND OF THE INVENTION

Field of the Invention

The invention relates to a method of improving occluded edge quality, and more particularly to a method of improving occluded edge quality in an augmented reality system based on a depth camera or depth cameras.

Description of the Related Art

Recently, the three-dimensional (3D) sensing technology is getting more and more popularized. The human's visual experience is no longer restricted to the two-dimensional space, but extends to the more instinctive 3D interaction. The commercial red-green-blue-depth (RGB-D) camera captures the spatial position and the color of a real object, and also estimates the depth of the object or target. In augmented reality, integrating RGB-D camera with a mobile device to provide a highly intelligent and human-oriented interaction will become the future development trend. However, in the existing augmented reality applications, mutual occlusion conditions may occur between virtual and real objects, or between human body and virtual objects. If the occlusion problem is not properly addressed, the incorrect spatial relationship between the objects may cause unnatural occlusion and thus deteriorate the user experience.

The common depth sensing principle is to utilize an infrared light source that continuously emits the infrared light to the object in the scene to perform the measurement and encoding, wherein a sensor reads the reflected light, and a chip performs decoding and calculating to generate an image having depth information.

When the infrared light is projected onto the surfaces of the objects with considerable transparency, the reflected spots are randomly formed, and the corresponding depth values are lost or have errors, thereby affecting the normal operation of the sensing function.

In the conventional depth sensing technology, a relatively spatial relationship between real and virtual objects is calculated according to a given viewing angle of a user. When the depth camera captures the scene information of the real world, the interaction (e.g., occlusion) between virtual models and real objects occurs. In order to display the occlusion effect of the virtual models, a depth buffer (Z-buffer) computation is typically performed on the depth data directly according to the viewing angle of the current camera and the models, and the occluded portions are removed, so that the occlusion condition of the models occluded by the objects in the scene at the current viewing angle is obtained. The depth buffer computation has the advantages that the computation is easy and can be easily implemented by hardware and that the computation can be performed without sorting in advance.

However, such a method will cause the virtual-real occlusion problem due to insufficient precision and resolution of the depth camera. The virtual-real occlusion problem causes the incorrect depth buffer calculations, and the region that should be obscured is depicted on the contrary. This problem becomes more apparent at the virtual-real occluded edge, so that the occluded edge has the uneven region to affect the visual presentation quality of augmented reality.

SUMMARY OF THE INVENTION

It is therefore an object of the invention to provide a method for improving occluded edge quality in augmented reality based on a depth camera, wherein a virtual plane is moved to improve the occluded edge quality and smoothen the occluded edge.

To achieve the above-identified object, the invention provides a method of improving occluded edge quality in an augmented reality system, the method comprising: a data input step of using a camera set, which comprises one or multiple cameras, to capture a scene and an object set, which comprises one or multiple objects, in the scene to obtain an original image; an occluded region extracting step, wherein a first virtual plane and a second virtual plane are set in the scene, depth buffer calculations are performed according to the first virtual plane and the original image to obtain a first image, depth buffer calculations are performed according to the second virtual plane and the original image to obtain a second image, and an extracted image is obtained by way of extracting according to a difference operation, which is performed according to the first image and the second image, where a distance from the first virtual plane to the camera set is k, a distance from the second virtual plane to the camera set is (k−h), and k and h are positive integers greater than 0, wherein the second virtual plane is disposed between the first virtual plane and the camera set; and an occluded image generating step, wherein a third virtual plane is set between the first virtual plane and the second virtual plane, a virtual object is inserted into the original image according to the extracted image, the third virtual plane and the original image to obtain an occluded image, and the virtual object is partially occluded by the object set.

The embodiment of the invention solves the problem of the poor virtual-real occluded edge quality caused by insufficient precision and resolution of the camera, and develops a method of improving the augmented reality application based on RGB-D camera. By calculating the intersection between the virtual plane and the occluded region and mapping the intersection back to the image, the uneven occluded edge can be in-painted. In the situation where multiple occluded regions are present, this method also groups the points, pertaining to different occluded regions, into different groups through the region growing method. In addition, the method of improving the occluded edge quality according to the embodiment of the invention will not reduce or distort the resultant image. Furthermore, the embodiment of the invention achieves good occlusion without in-painting the depth data.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

DETAILED DESCRIPTION OF THE INVENTION

The method of improving occluded edge quality according to the embodiment of the invention calculates the occluded edge intersection to in-paint occluded results in augmented reality based on 3D point information and computer vision in conjunction with geometric processing techniques.

Figure 1:
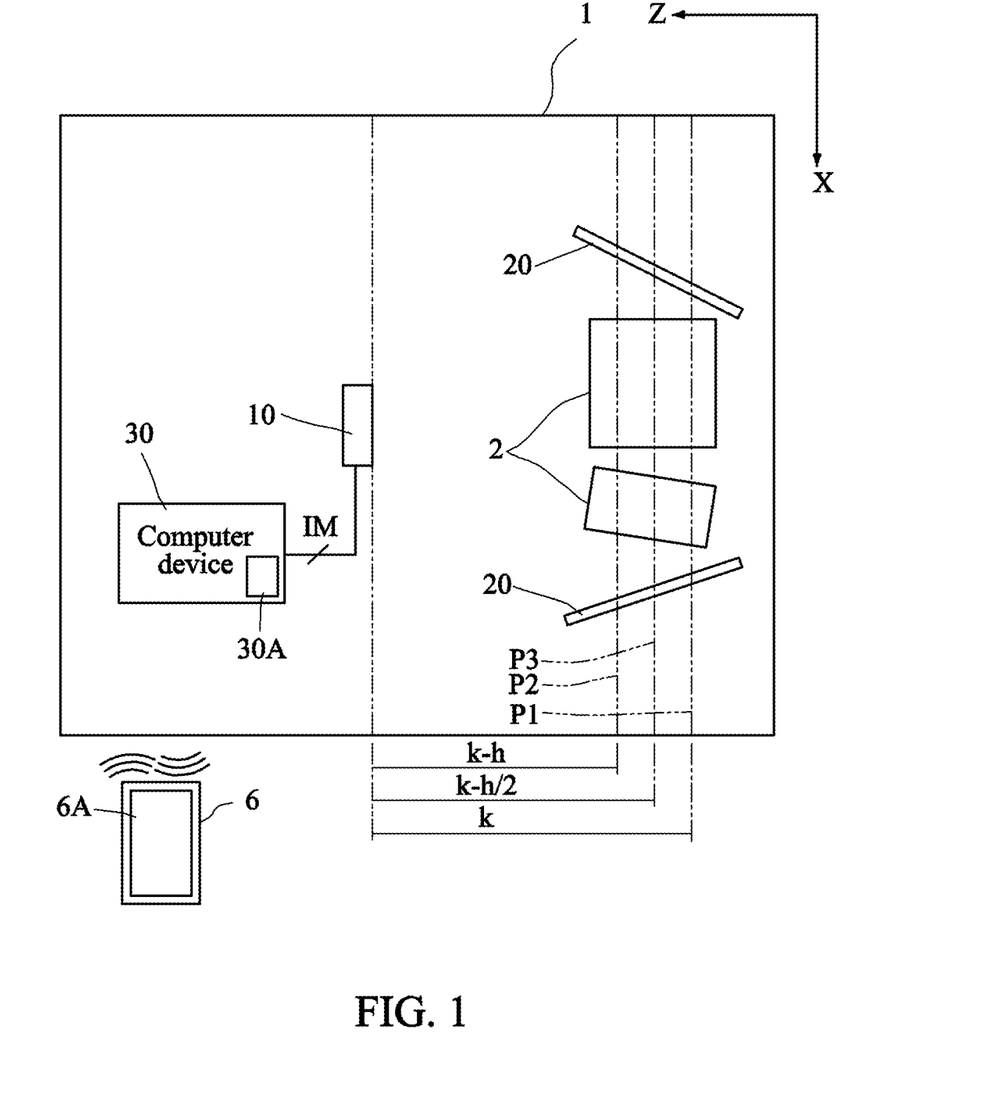
FIG. 1 is a schematic top view showing an augmented reality system according to a preferred embodiment of the invention.
Figure 2:
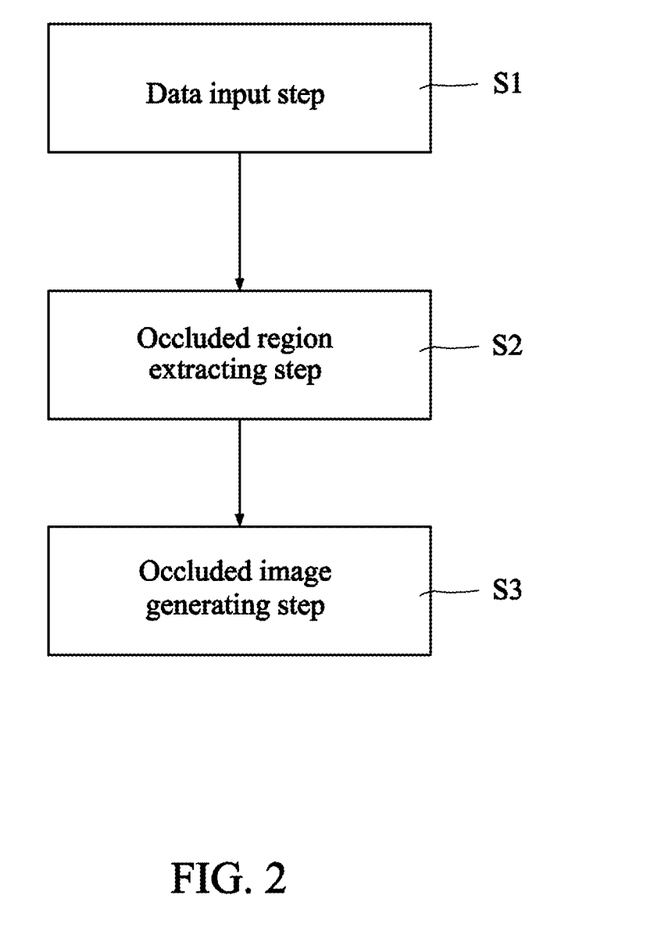
FIG. 2 is a flow chart showing a method of improving occluded edge quality according to the preferred embodiment of the invention.

FIG. 1 is a schematic top view showing an augmented reality system according to a preferred embodiment of the invention. FIG. 2 is a flow chart showing a method of improving occluded edge quality according to the preferred embodiment of the invention. Referring to FIGS. 1 and 2, the method of improving occluded edge quality of this embodiment is used in the augmented reality system. The method comprises a data input step S1, an occluded region extracting step S2 and an occluded image generating step S3, and may be executed using a computer host, a mobile phone or a computer device 30 of a server.

First, a range is defined or set for the extraction of the virtual-real occluded region in order to find the occluded region near the occluded edge or edges and to perform the plane regression on the occluded range between a to-be-detected object and a virtual plane.

In the data input step S1, the computer device 30 controls a camera set 10 to capture a scene 1 and an object set 2 in the scene 1 to obtain an original image IM. The computer device 30 is signal connected to the camera set 10. In this embodiment, the object set 2 comprises two objects, and the camera set 10 comprises a depth camera and a color (RBG) camera, which may also be replaced with a black-and-white or gray level camera as long as a visible light image can be obtained. Thus, the original image IM comprises depth data and visible light image data. In the data input step S1, two stoppers 20 are further disposed on two sides of the object set 2, respectively, wherein the provision of the stoppers makes the environment light source stable, and first to third virtual planes P1 to P3 pass through the two stoppers 20 and the object set 2.

Figure 3A:
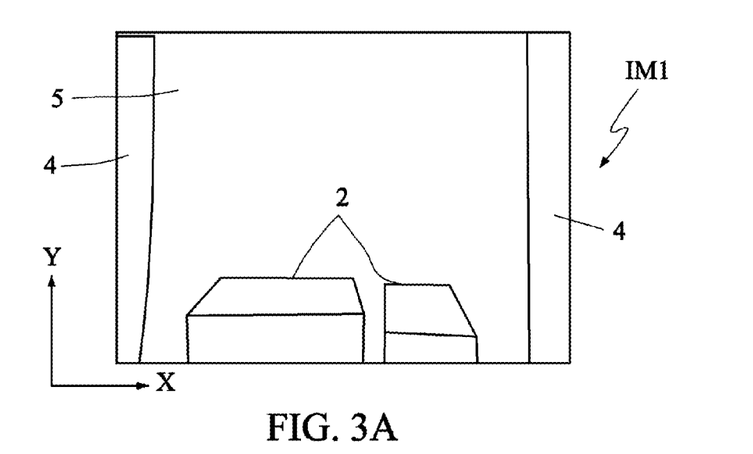
FIGS. 3A to 3G are schematic views showing results in steps of the method of improving the occluded edge quality.
Figure 3B:
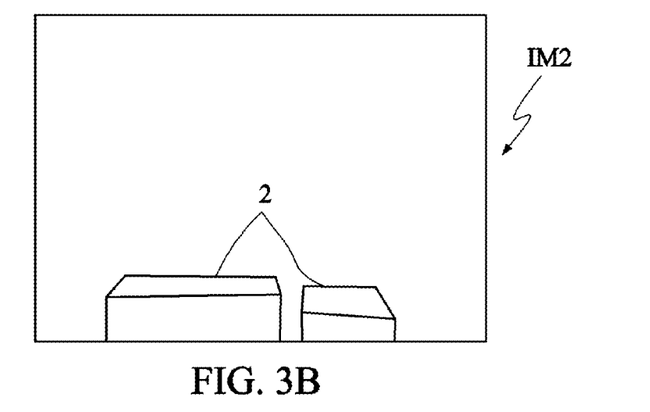
Figure 3C:
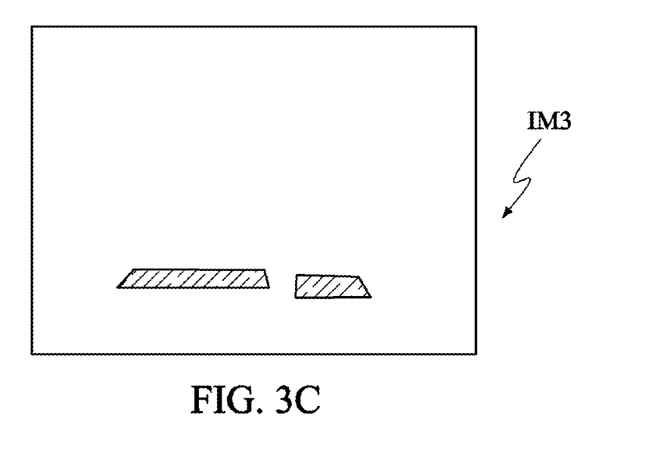
Figure 6A:
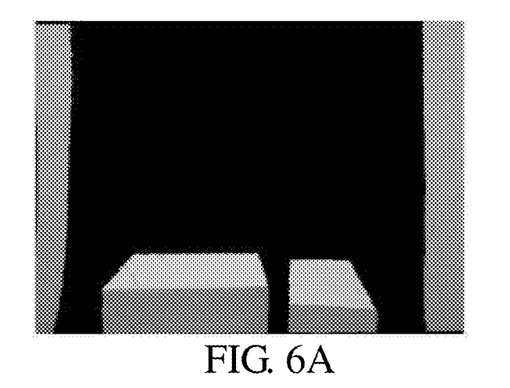
FIGS. 6A to 6E are schematic views respectively showing actual results corresponding to FIGS. 3A to 3E.
Figure 6B:
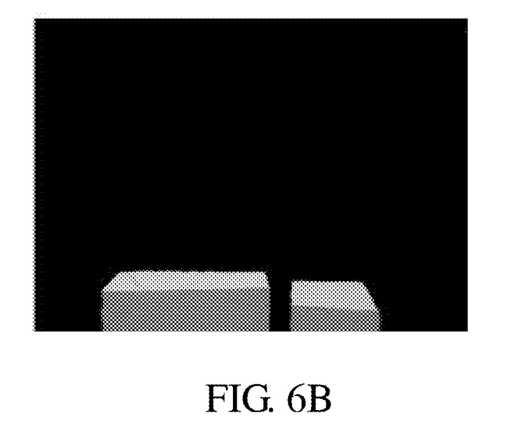
Figure 6C:
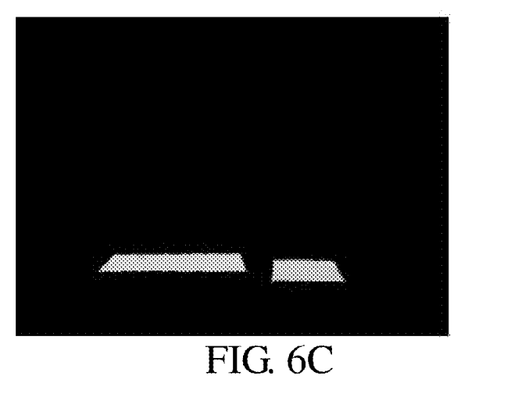

In the occluded region extracting step S2, the computer device 30 sets the first virtual plane P1 and the second virtual plane P2 in the scene 1, performs depth buffer calculations according to the first virtual plane P1 and the original image IM to obtain a first image IM1 (the schematic results of FIG. 3A corresponding to the actual results of FIG. 6A, wherein the two side portions are the images of sidewalls 4 disposed on two sides of a front wall 5), and performs depth buffer calculations according to the second virtual plane P2 and the original image IM to obtain a second image IM2 (the schematic results of FIG. 3B corresponding to the actual results of FIG. 6B), and an extracted image IM3 (the schematic results of FIG. 3C corresponding to the actual results of FIG. 6C) is obtained by way of extracting according to a difference operation, which is performed according to the first image IM1 and the second image IM2. In this embodiment, each of the first image IM1 and the second image IM2 contains depth data and visible light image data, and the extracted image IM3 only contains the visible light image data. The distance from the first virtual plane P1 to the camera set 10 is denoted as k, and the distance from the second virtual plane P2 to the camera set 10 is denoted as (k−h), where k and h are positive integers greater than 0, and may also be set or adjusted by the user, or adaptively adjusted by the computer device automatically according to the database and the parameters of the scene. The second virtual plane P2 is disposed between the first virtual plane P1 and the camera set 10. It is worth noting that "setting the virtual plane (disposing the virtual plane in the scene)" and "depth buffer calculations (3D point group buffer check)" pertain to the front processing of foreground and background calculations based on the virtual model and the real scene in order to depict the same one pixel point having the foreground with the smaller depth value on the two-dimensional image in augmented reality, so that the more instinctive virtual-real occlusion results can be obtained.

Figure 4A:
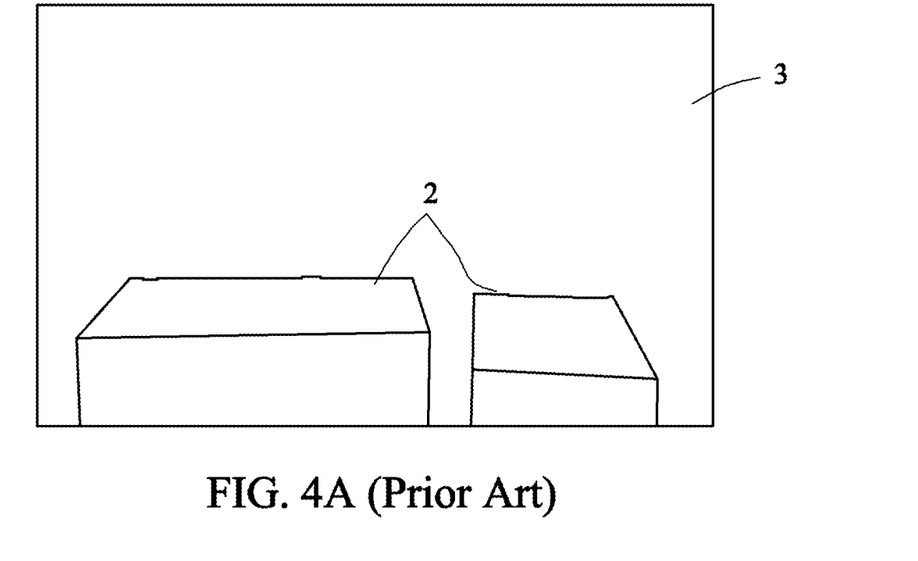
FIGS. 4A and 4B are schematic views showing occluded results in an example using the prior art and the embodiment of the invention.
Figure 4B:
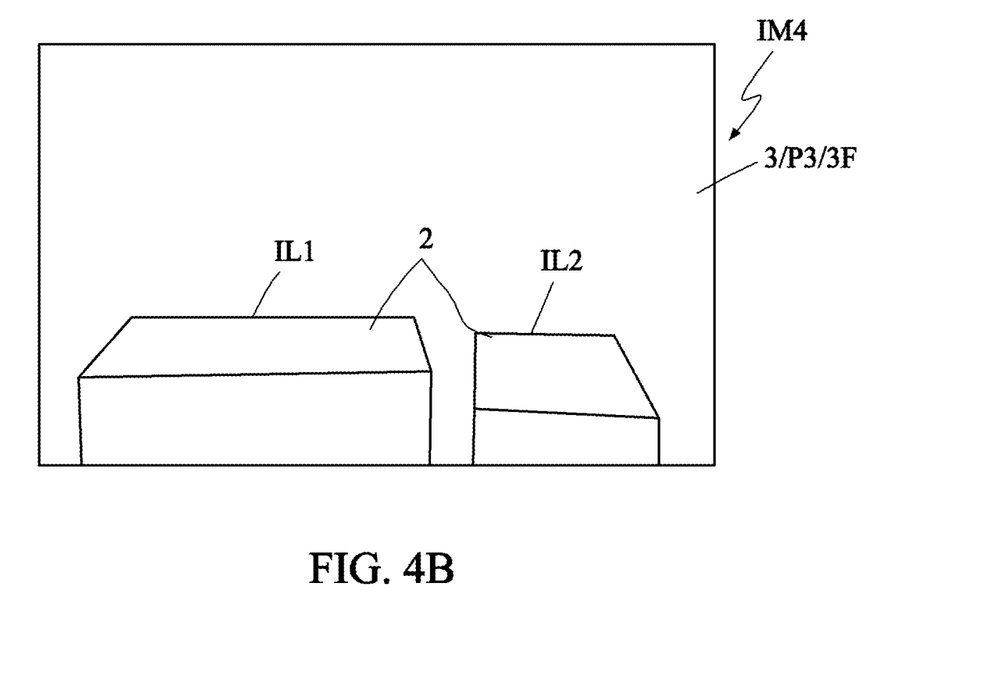
Figure 5A:
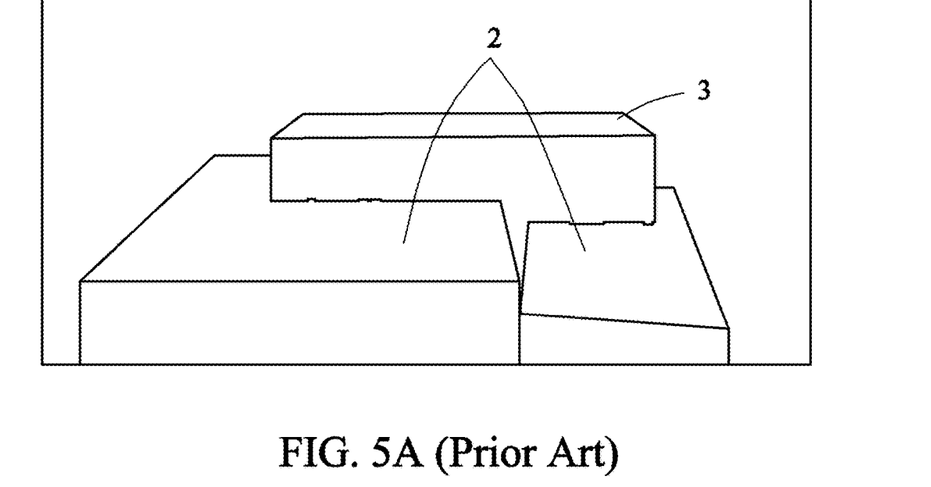
FIGS. 5A and 5B are schematic views showing occluded results in another example using the prior art and the embodiment of the invention.
Figure 5B:
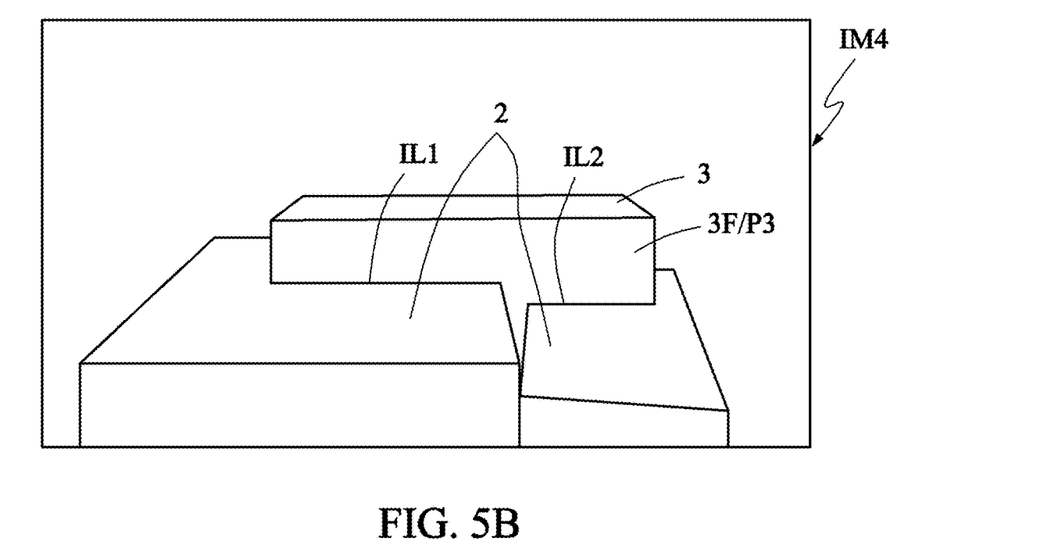

In the occluded image generating step S3, the computer device 30 sets the third virtual plane P3 between the first virtual plane P1 and the second virtual plane P2, and inserts a virtual object 3 into the original image IM according to the extracted image IM3, the third virtual plane P3 and the original image IM to obtain an occluded image 11M4 having a smoothened occluded edge or edges, wherein the virtual object 3 is partially occluded by the object set 2, as shown in FIGS. 4B and 5B. The details will be described in the following. It is to be noted that the computer device 30 may have a central processing unit (CPU), a memory, a storage device (hard disk drive), a display 30A for displaying the occluded image especially in a real-time manner, or the computer device 30 may transmit the occluded image to a mobile phone or a tablet computer of the user through a wired network or a wireless network. The computer device 30 may be installed with an application program to execute the method of the invention, including the step of displaying the occluded image on the display 30A. If the occluded image is to be displayed on a mobile device 6 (see FIG. 1), such as a mobile phone of the user, the mobile device 6 may be installed with another application program and connected to the computer device 30 installed with the application program so that the user may control the computer device 30 to execute the application program to execute the data input step, the occluded region extracting step and the occluded image generating step, and additionally control the computer device 30 to transmit the occluded image to the mobile device 6, which displays the occluded image on a display 6A of the mobile device 6.

In this embodiment, a foreground surface 3F of the virtual object 3 facing the camera set 10 is disposed on the third virtual plane P3, and the third virtual plane P3 is disposed in the middle between the first virtual plane P1 and the second virtual plane P2. That is, the distance from the third virtual plane P3 to the camera set 10 is (k−h/2). However, this is only provided for the sake of illustration, and does not intend to restrict the invention thereto.

The occluded image generating step S3 comprises the steps of: (a) obtaining a plane equation set according to the extracted image IM3; (b) calculating an intersection set between the plane equation set and the third virtual plane P3; and (c) inserting the virtual object 3 into the original image IM according to the intersection set and the original image IM to obtain the occluded image IM4.

The step (a) comprises the steps of: (a1) performing an edge profile detection according to the extracted image IM3, to generate edge points of the occluded region set; (a2) performing a grouping process according to the edge points to generate a grouping result, wherein the grouping result comprises q 3D point groups of q occluded regions corresponding to the occluded region set, where q is a positive integer greater than or equal to 1; and (a3) performing a 3D point group plane regression according to the 3D point group to obtain the plane equation set.

Figure 3D:
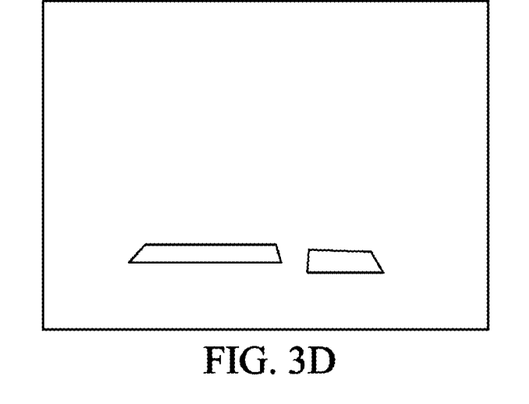
Figure 6D:
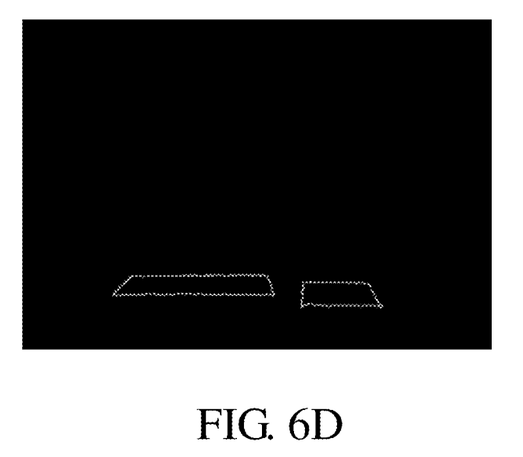

The extracted image IM3 comprises occluded region set data corresponding to an occluded region set. In this embodiment, the occluded region set comprises two occluded regions. In step (a1), edge points of the occluded region of the extracted image IM3 of FIG. 3C may be obtained through an edge profile detection method, such as Canny edge profile detection method. First, a Gaussian filter is applied to eliminate the noise to smoothen the image. Next, a first-order differential method is applied to calculate the smoothened image to obtain the first-order differential gradient values and the azimuth angles thereof in the X and Y directions. After the gradient values and directions of the pixels have been obtained, the edge must be thinned in order to ensure the precise positioning of the edge, so that the pixel points with the maximum local gradient variations are reserved. This method is referred to as a non-maximum suppression principle. The result obtained after the non-maximum suppression has been finished contains noise or false edges, so a double-threshold value detection needs to be performed to find out the precise edge. FIG. 3D shows a schematic result, which is obtained after the edge profile detection has been performed and corresponds to the actual result of FIG. 6D.

Figure 3E:
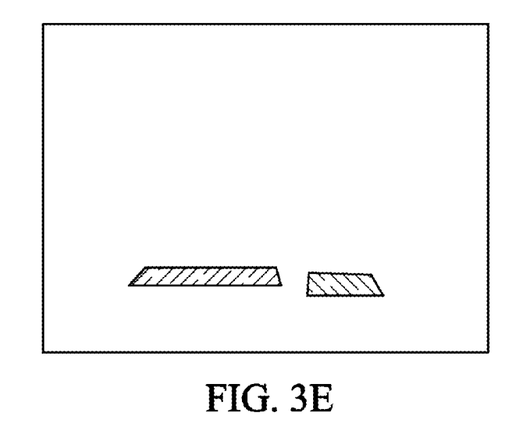
Figure 6E:
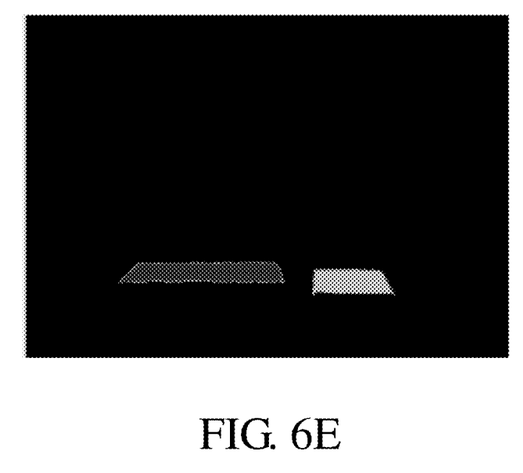

After the edge profile detection of the occluded region(s) has been performed, the coordinates of the edge pixel points of the occluded region(s) are obtained, and a region growing method of Zucker, for example, may be applied to perform the grouping operation to group the object with the occluded region(s). The basic principle of the region growing method is to set one pixel as a seed pixel. Starting from the seed pixel, the neighboring pixels with smaller variations are identified as the same kind according to the gradient variations of the gray level values, the newly added pixel point of the same kind is set as a sub-seed, and the gray level differences between the sub-seed and the neighboring pixel points are continuously determined. This method is performed so that the region continuously expands outwards, and finally the image block(s) with the similar gray level values are produced. Therefore, the step (a2) comprises the steps of: (a21) randomly setting an occluded region point from a point group of an occluded region of the extracted image IM3 as a seed; (a22) checking whether neighboring points of the seed pertain to the edge points or not, and setting neighboring points at neighboring positions of the edge points as sub-seeds; (a23) repeating the step (a22) to check the neighboring points of each of the sub-seeds, and then continuously processing second neighboring points at the neighboring positions of the neighboring points and expanding outwards until all of the second neighboring points pertain to the edge points; (a24) eliminating the seed and the sub-seeds from the point group of the occluded region after the step (a23) has ended; and (a25) checking whether the number of the occluded region points remained in the point group of the occluded region is greater than the total number of the edge points or not, and ending the method if not or repeating steps (a21) to (a25) if yes. The grouping result is depicted in FIG. 3E corresponding to the actual result of FIG. 6E, where two groups are obtained.

Next, the random sample consensus (RANSAC) concept is applied to perform the plane regression of the 3D point group to obtain the plane equation set of the point group. Thus, the step (a3) comprises the steps of: (a31) randomly taking n points from the grouping result to perform the 3D-point plane regression, and to obtain an initial plane equation, where n is a positive integer greater than 1; (a32) substituting all m points of the point group pertaining to the same occluded region into the initial plane equation to calculate an average residual, where m is a positive integer greater than 1; (a33) repeating steps (a31) and (a32) (p−1) times to obtain p average residuals, where p is a positive integer greater than 1; (a34) looking for a minimum average residual from the p average residuals, and defining the initial plane equation corresponding to the minimum average residual as a plane equation in the plane equation set; and (a35) if q is greater than 1, then repeating the steps (a31) to (a34) (q−1) times to obtain q plane equations in the plane equation set. Two plane equations may be obtained according to the result of FIG. 3E.

In the RANSAC process according to the embodiment of the invention, the linear regression (1) is solved according to the concept of the least squares method, and the points pertaining to the same group are substituted into the regression.

$$z = ax + by + c \qquad (1)$$

The linear regression (1) is solved by way of the least squares method, and Equation (2) may be obtained, where:

$$F(a, b, c) = \sum_{i=1}^{n} (z_i - ax_i - by_i - c)^2 \qquad (2)$$

Then, the method of solving the first-order differential equation is applied to solve three unknown equations of $$\frac{\partial F}{\partial a} = 0, \frac{\partial F}{\partial b} = 0, \frac{\partial F}{\partial c} = 0,$$

and the following Equation (3) may be obtained:

$$\begin{cases} \sum_{i=1}^{n} ax_i^2 + bx_i y_i + cx_i = \sum_{i=1}^{n} x_i z_i \\ \sum_{i=1}^{n} ax_i y_i + by_i^2 + cy_i = \sum_{i=1}^{n} y_i z_i \\ \sum_{i=1}^{n} ax_i + by_i + c = \sum_{i=1}^{n} z_i \end{cases} \qquad (3)$$

The three equations of Equation (3) are linear equations, and thus can be transformed into a matrix to solve the following equation, as shown in Equation (4). When the left-side 3×3 matrix is reversible, the inverse matrix may be applied to solve the equation as Equation (5):

$$\begin{bmatrix} \sum x_i^2 & \sum x_i y_i & \sum x_i \\ \sum x_i y_i & \sum y_i^2 & \sum y_i \\ \sum x_i & \sum y_i & n \end{bmatrix} \begin{bmatrix} a \\ b \\ c \end{bmatrix} = \begin{bmatrix} \sum x_i z_i \\ \sum y_i z_i \\ \sum z_i \end{bmatrix} \quad (4)$$

$$\begin{bmatrix} a \\ b \\ c \end{bmatrix} = \begin{bmatrix} \sum x_i^2 & \sum x_i y_i & \sum x_i \\ \sum x_i y_i & \sum y_i^2 & \sum y_i \\ \sum x_i & \sum y_i & n \end{bmatrix}^{-1} \begin{bmatrix} \sum x_i z_i \\ \sum y_i z_i \\ \sum z_i \end{bmatrix} \quad (5)$$

The plane equation corresponding to each point group in the portion where the to-be-detected object is occluded by the virtual plane can be obtained using the least squares method.

Figure 3F:
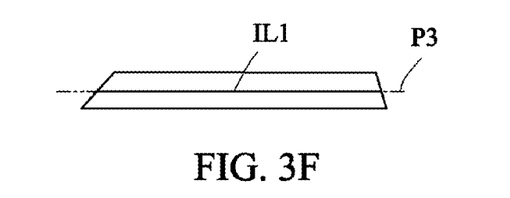
Figure 3G:
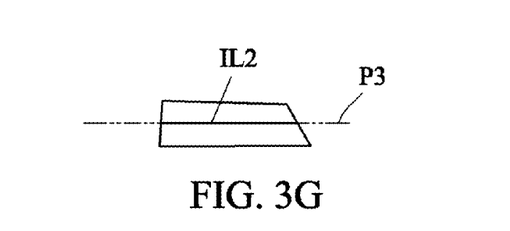
Figure 7A:
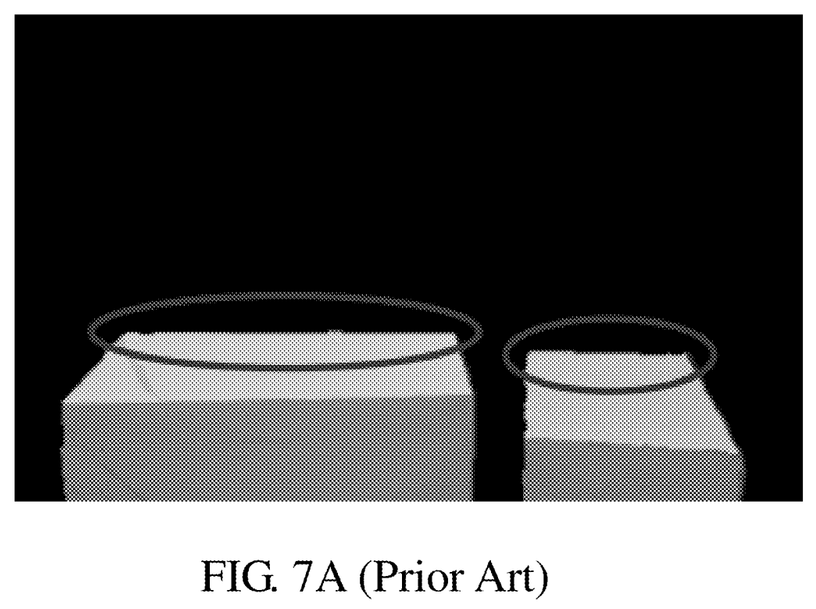
FIGS. 7A and 7B are schematic views respectively showing actual results corresponding to FIGS. 4A and 4B.
Figure 7B:
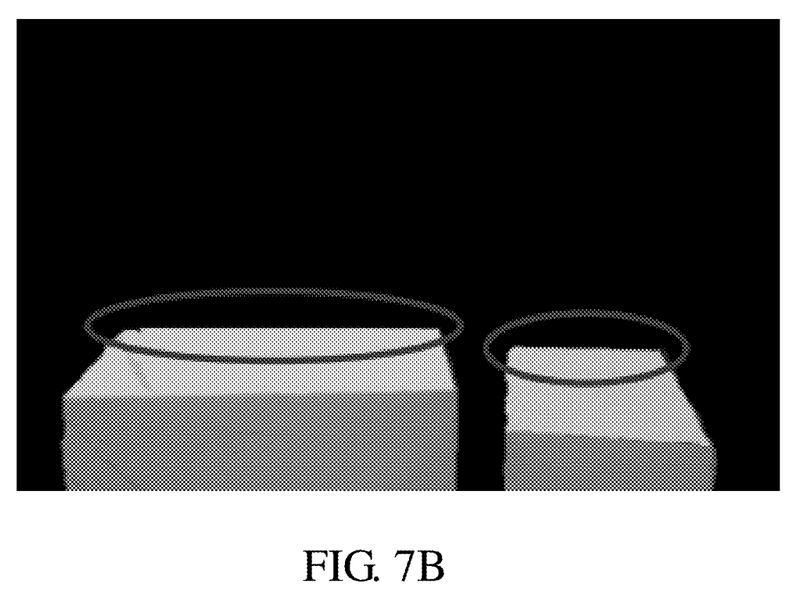

The details of the steps (b) and (c) will be described in the following. After the regression plane equation has been obtained, the intersection between the regression plane equation and the virtual plane is computed. In this case, however, the obtained intersection is an infinite line without starting and ending points. So, it is necessary to obtain the starting and ending points of this desired intersection in advance. Because the position of the third virtual plane P3 is pre-determined, the third virtual plane P3 is perpendicular to the camera by a fixed distance. Thus, it is possible to search the 3D points of each 3D point group having the Z coordinate values pertaining to the vicinity where the third virtual plane P3 is placed, to save these points, and to find out the maximum and minimum values of the X coordinate values and the Y coordinate values from each group, wherein the starting and ending positions of the intersection can be determined according to the maximum and minimum X coordinate values and Y coordinate values, and the constructed lines are the intersection IL1 of FIG. 3F and the intersection IL2 of FIG. 3G. Because errors occur when the infrared light is reflected back to the camera at different angles, the plane equations of the two point groups need to be processed separately to obtain the intersections IL1 and IL2. The intersection IL1 and the intersection IL2 form the intersection set. After the starting and ending points have been obtained, all the 3D coordinate points pertaining to the intersection can be calculated. Then, the function for the depth camera can be used to find out the color values corresponding to the 3D points pertaining to the intersection, and to finally map the 3D coordinate points and the color values, pertaining to the intersection, back to the image on the screen of the display, so that the uneven virtual-real occluded edges (the portions of the intersections IL1 and IL2) can be in-painted, as shown in FIGS. 4B and 7B, wherein the virtual object 3 is set as one plane, which coincides with the third virtual plane P3 and the foreground surface 3F. FIGS. 4A and 7A show results with the uneven occluded edges because the method of the invention is not used. The ellipses in FIGS. 7A and 7B emphasize the portions of the occluded edges, and do not pertain to the occluded results.

Therefore, in the step (c) of this embodiment, the 3D coordinate points and the color values of one or multiple intersections of the intersection set are mapped back to the occluded results of the virtual object 3 and the original image IM to obtain the occluded image IM4. In another example, the occluded results of the virtual object 3 and the original image IM may also be re-depicted according to one or multiple intersections of the intersection set to obtain the occluded image IM4.

Figure 8A:
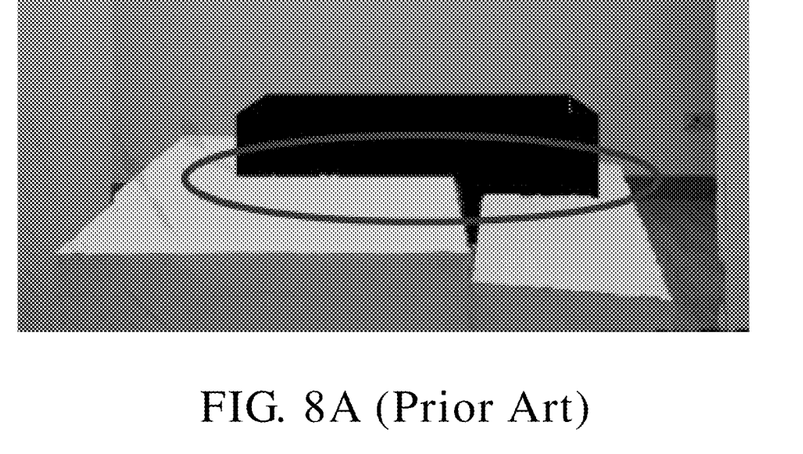
FIGS. 8A and 8B are schematic views respectively showing actual results corresponding to FIGS. 5A and 5B.
Figure 8B:
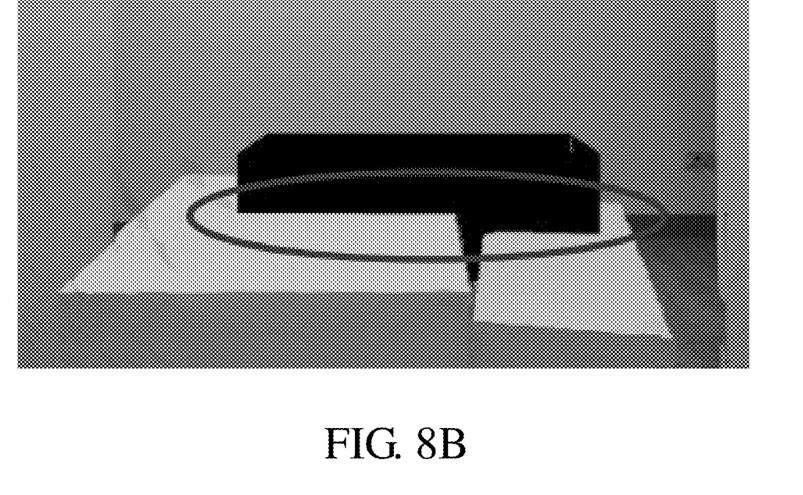

FIGS. 8A and 8B are schematic views respectively showing actual results corresponding to FIGS. 5A and 5B. It is worth noting that the virtual object 3 is a cuboid, and the placement positions of the two objects in the object set 2 are slightly changed. Comparing FIG. 8A with FIG. 8B, the intersections IL1 and IL2 of FIG. 8B have the smoothened occluded edges, and the intersections IL1 and IL2 of FIG. 8A have the uneven occluded edges. The ellipses in FIGS. 8A and 8B emphasize the portions of the occluded edges, and do not pertain to the occluded results.

The embodiment of the invention solves the problem of the poor virtual-real occluded edge quality caused by insufficient precision and resolution of the camera (e.g., the existing depth camera has 512×424 pixels, which are significantly lower than 1920×1082 pixels of the color camera), and develops a method of improving the augmented reality application based on RGB-D camera. By calculating the intersection between the virtual plane and the occluded region and mapping the intersection back to the image, the uneven occluded edge can be in-painted. In the situation where multiple occluded regions are present, this method also groups the points, pertaining to different occluded regions, into different groups through the region growing method. In addition, the method of improving the occluded edge quality according to the embodiment of the invention will not reduce and distort the resultant image. Furthermore, the embodiment of the invention achieves good occlusion without in-painting the depth data.

While the present invention has been described by way of examples and in terms of preferred embodiments, it is to be understood that the present invention is not limited thereto. To the contrary, it is intended to cover various modifications. Therefore, the scope of the appended claims should be accorded the broadest interpretation so as to encompass all such modifications.

What is claimed is:

1. A method of improving occluded edge quality in an augmented reality system, which comprises a camera set and a computer device, the method comprising:

a data input step of using the camera set, which comprises one or multiple cameras, to capture a scene and an object set, which comprises one or multiple objects, in the scene to obtain an original image;

an occluded region extracting step executed by the computer device, wherein a first virtual plane and a second virtual plane are set in the scene, depth buffer calculations are performed according to the first virtual plane and the original image to obtain a first image, depth buffer calculations are performed according to the second virtual plane and the original image to obtain a second image, and an extracted image is obtained by way of extracting according to a difference operation performed according to the first image and the second image, where a distance from the first virtual plane to the camera set is k, a distance from the second virtual plane to the camera set is (k-h), and k and h are positive integers greater than 0, wherein the second virtual plane is disposed between the first virtual plane and the camera set; and an occluded image generating step executed by the computer device, wherein a third virtual plane is set between the first virtual plane and the second virtual plane, a virtual object is inserted into the original image according to the extracted image, the third virtual plane and the original image to obtain an occluded image, and the virtual object is partially occluded by the object set, wherein each of the original image, the first image and the second image contains depth data and visible light image data.

2. The method of improving the occluded edge quality according to claim 1, wherein a foreground surface facing the virtual object of the camera set is disposed on the third virtual plane.

3. The method of improving the occluded edge quality according to claim 1, wherein a distance from the third virtual plane to the camera set is (k−h/2).

4. The method of improving the occluded edge quality according to claim 1, wherein in the data input step, two stoppers are further disposed on two sides of the object set, respectively, and the first to third virtual planes pass through the two stoppers and the object set.

5. The method of improving the occluded edge quality according to claim 1, wherein the occluded image generating step comprises steps of:
   (a) calculating the extracted image to obtain a plane equation set comprising one or multiple plane equations;
   (b) calculating an intersection set comprising one or multiple intersections between the plane equation set and the third virtual plane; and
   (c) inserting the virtual object into the original image according to the intersection set and the original image to obtain the occluded image.

6. The method of improving the occluded edge quality according to claim 5, wherein the extracted image comprises occluded region set data corresponding to an occluded region set comprising one or multiple occluded regions, and the step (a) comprises sub-steps of:
   (a1) performing an edge profile detection according to the extracted image to generate edge points of the occluded region set;
   (a2) performing a grouping process according to the edge points to generate a grouping result, which comprises q three-dimensional (3D) point groups corresponding to q occluded regions of the occluded region set, where q is a positive integer greater than or equal to 1; and
   (a3) performing a 3D point group plane regression according to the 3D point groups to obtain the plane equation set.

7. The method of improving the occluded edge quality according to claim 6, wherein the step (a2) comprises steps of:
   (a21) randomly setting an occluded region point as a seed in a point group of an occluded region of the extracted image;
   (a22) checking whether neighboring points of the seed pertain to the edge points or not, and setting neighboring points at neighboring positions of the edge points as sub-seeds;
   (a23) repeating the step (a22) to check neighboring points of each of the sub-seeds, and then continuously processing second neighboring points at neighboring positions of the neighboring points and expanding outwards, until all the second neighboring points pertain to the edge points;
   (a24) eliminating the seed and the sub-seeds from the point group of the occluded region after the step (a23) has ended; and
   (a25) checking whether the number of the occluded region points remained in the point group of the occluded region is greater than a total number of the edge points or not, and ending if not or repeating the steps (a21) to (a25) if yes.

8. The method of improving the occluded edge quality according to claim 6, wherein the step (a3) comprises sub-steps of:
   (a31) randomly taking n points from the grouping result to perform a 3D-point plane regression to obtain an initial plane equation, where n is a positive integer greater than 1;
   (a32) substituting all m points pertaining to a point group of the same occluded region into the initial plane equation to calculate an average residual, where m is a positive integer greater than 1;
   (a33) repeating the steps (a31) and (a32) (p−1) times to obtain p average residuals, where p is a positive integer greater than 1;
   (a34) looking for a minimum average residual from the p average residuals, and defining the initial plane equation corresponding to the minimum average residual as a plane equation in the plane equation set; and
   (a35) repeating the steps (a31) to (a34) (q−1) times to obtain the q plane equations in the plane equation set if q is greater than 1.

9. The method of improving the occluded edge quality according to claim 5, wherein in the step (c), 3D coordinate points and color values of the one or multiple intersections of the intersection set are mapped back to an occluded result of the virtual object and the original image to obtain the occluded image.

10. The method of improving the occluded edge quality according to claim 5, wherein in the step (c), occluded results of the virtual object and the original image are re-depicted according to the one or multiple intersections of the intersection set to obtain the occluded image.

11. The method of improving the occluded edge quality according to claim 1, wherein a display of the computer device displays the occluded image.

12. The method of improving the occluded edge quality according to claim 1, wherein the computer device further transmits the occluded image to a mobile device, and a display of the mobile device displays the occluded image.

13. The method of improving the occluded edge quality according to claim 1, wherein the extracted image only contains the visible light image data.

* * * * *